United States Patent [19]
Furuta et al.

[11] Patent Number: 5,817,384
[45] Date of Patent: Oct. 6, 1998

[54] LAMINATED MATERIAL AND PAPER PACK CONTAINER FORMED FROM SAID MATERIAL

[75] Inventors: Motonobu Furuta, Chiba; Takanari Yamaguchi, Tsukuba, both of Japan

[73] Assignee: Sumitomo Chemical Company, Limited, Osaka, Japan

[21] Appl. No.: 712,415

[22] Filed: Sep. 11, 1996

[30] Foreign Application Priority Data

Sep. 11, 1995 [JP] Japan ................................. 7-232349

[51] Int. Cl.$^6$ .................. C09K 19/00; B32B 27/36
[52] U.S. Cl. ............... 428/1; 428/34.2; 428/480; 206/524.1; 229/3.1; 229/3.5 R; 220/457; 220/458; 252/299.01
[58] Field of Search ............... 428/1, 34.2, 480, 428/481, 483; 206/524.1, 524.2, 524.3, 524.4; 229/3.1, 3.5 R; 252/299.01, 299.62, 299.65, 299.66; 220/457, 458

[56] References Cited

U.S. PATENT DOCUMENTS

| | | | |
|---|---|---|---|
| 5,216,073 | 6/1993 | Haider et al. | 525/66 |
| 5,358,661 | 10/1994 | Mazaki et al. | 428/1 |
| 5,364,669 | 11/1994 | Sumida et al. | 428/1 |
| 5,529,716 | 6/1996 | Nomura et al. | 428/1 |
| 5,612,101 | 3/1997 | Furuta et al. | 206/524.2 |

FOREIGN PATENT DOCUMENTS

| | | |
|---|---|---|
| 0423511 | 4/1991 | European Pat. Off. |
| 0672721 | 9/1995 | European Pat. Off. |
| 2166685 | 5/1986 | United Kingdom. |

OTHER PUBLICATIONS

Database WPI, Section Ch, Week 9333, AN 93–261313, JP–A–05 177 797, Kuraray Co., Ltd., Derwent Publications, Ltd. (1993) abstract.
Database WPI, Section Ch, Week 9137, AN 91–269739, JP–A–03 176 123, Toray Ind. Inc., Derwent Publications, Ltd. (1991) abstract.
Database WPI, Section Ch, Week 8738, AN 87–268072, JP–A–62 187 033, Mitsubishi Chem. Ind. KK, Derwent Publications, Ltd. (1987) abstract.

*Primary Examiner*—Rena L. Dye
*Attorney, Agent, or Firm*—Birch, Stewart, Kolasch & Birch, LLP

[57] ABSTRACT

The present invention provides a laminated material comprising a paper as a substrate, which is superior in heat resistance and gas barrier properties, and a paper pack container formed from said laminated material. Disclosed is a laminated material comprising at least a paper layer as a substrate and a layer of a liquid crystal polyester resin composition containing 56 to 99% by weight of a liquid crystal polyester (A) and 44 to 1% by weight of an epoxy group-containing ethylene copolymer consisting of the following components:

(a) 50 to 99.9% by weight of an ethylene unit;
(b) 0.1 to 30% by weight of an unsaturated carboxylic acid glycidyl ester unit or an unsaturated glycidyl ether unit; and
(c) 0 to 49.9% by weight of an ethylenically unsaturated ester compound, the paper layer and the layer of the liquid polyester resin composition being laminated each other. A paper pack container formed from said laminated material is also disclosed.

11 Claims, 1 Drawing Sheet

1. Low density polyethylene layer
2. Liquid crystal polyester resin composition layer
3. Milk carton paper FIG. 1
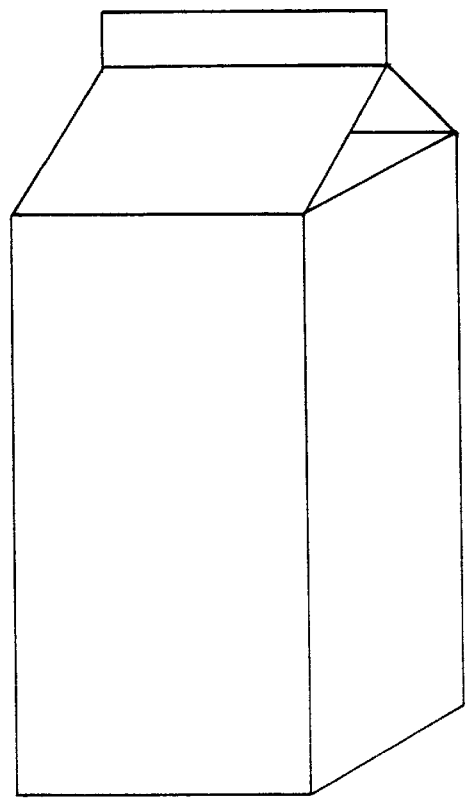
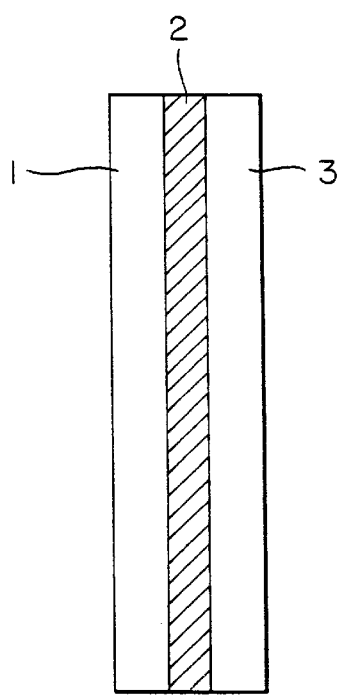
1. Low density polyethylene layer
2. Liquid crystal polyester resin composition layer
3. Milk carton paper
FIG. 2

LAMINATED MATERIAL AND PAPER PACK CONTAINER FORMED FROM SAID MATERIAL

FIELD OF THE INVENTION

The present invention relates to a laminated material comprising a paper layer and a liquid crystal polyester resin composition layer. More particularly, it relates to a laminated material which is superior in heat resistance and gas barrier properties, and a paper pack container formed from said laminated material.

BACKGROUND OF THE INVENTION

A paper container whose one or both surfaces are processed with polyolefin is characterized by lightweight (causing no breakage), cheapness and good sanitation, and has widely been used in the industrial fields, particularly beverage and food. However, gas barrier properties of the paper container were insufficient. Therefore, a laminated material comprising a polyolefin film, an engineering plastic film and a paper has been developed. However, the polyolefin film and general-purpose engineering plastic film are insufficient in gas barrier properties to water vapor, oxygen, etc. and, therefore, oxidation, deterioration or rottenness of contents is liable to arise in a paper pack container comprising them as constituent components. Alternatively, there was a problem of insufficient heat resistance.

This kind of a problem has been hitherto studied. For example, in Japanese Patent Kokai (Laid-Open) Publication No. 1-199880, there is described a paper pack container comprising a paper layer and a gas barrier synthetic resin.

In Japanese Patent Kokai (Laid-Open) Publication No. 3-61040, there is described a laminated film comprising a layer of poly-3-methyl-1-butene and a paper layer.

In Japanese Patent Kokai (Laid-Open) Publication No. 3-153348, there is described a laminated sheet comprising a paper layer and a polymer layer containing ethylene-vinyl alcohol copolymer.

In Japanese Patent Kokai (Laid-Open) Publication No. 5-154964, there is described a packaging material comprising a paper layer and a polymer layer containing an ethylene-vinyl acetate copolymer.

However, any laminate comprising a paper as the substrate described above was not sufficient in gas barrier properties or heat resistance.

On the other hand, a laminate comprising a paper and a metal foil such as aluminum foil is also known. In this case, gas barrier properties are excellent but pinhole is liable to arise. Various problems are pointed out, that is, it can not be used in a microwave oven the disposal treatment is difficult because of containing the metal foil.

The present inventors have intensively studied so as to solve these problems. As a result, the present invention has been accomplished.

OBJECTS OF THE INVENTION

It is an object of the present invention to provide a laminated material comprising a paper as a substrate, which is superior in heat resistance and gas barrier properties, and a paper pack container formed from said laminated material.

This object as well as other objects and advantages of the present invention will become apparent to those skilled in the art from the following description with reference to the accompanying drawings.

BRIEF DESCRIPTION OF THE DRAWINGS

1. FIG. 1 is a general view illustrating one embodiment of a paper pack container formed from a laminated material of the present invention.

2. FIG. 2 is a sectional view illustrating one embodiment of a laminate of the paper pack container of FIG. 1.

SUMMARY OF THE INVENTION

That is, the present invention provides a laminated material comprising at least a paper layer as a substrate and a layer of a liquid crystal polyester resin composition containing 56 to 99% by weight of a liquid crystal polyester (A) and 44 to 1% by weight of an epoxy group-containing ethylene copolymer (B) consisting of the following components:

(a) 50 to 99.9% by weight of an ethylene unit;

(b) 0.1 to 30% by weight of an unsaturated carboxylic acid glycidyl ester unit or an unsaturated glycidyl ether unit; and (c) 0 to 49.9% by weight of an ethylenically unsaturated ester compound, the paper layer and the layer of the liquid polyester resin composition being laminated each other.

Also, the present invention provides a paper pack container formed from said laminated material.

DESCRIPTION OF PREFERRED EMBODIMENTS

The present invention will be described in detail, hereinafter.

The paper as the substrate in the present invention is not specifically limited, and examples thereof include kraft paper, milk carton paper, gravure paper, clay-coated paper, general wood free paper, white board, manila board, liner, millboard, Japanese paper, etc.

A thickness of the paper layer as the substrate of the present invention is not specifically limited and the thickness of the paper layer can be varied according to the purpose. The paper layer having the thickness within the range from 5 to 1000 μm is preferably used.

A liquid crystal polyester as the component (A) of the liquid crystal polyester resin composition in the present invention is a polyester referred to as a thermoplastic liquid crystal polymer.

Specific examples thereof include the followings:

(1) polyester of a combination of an aromatic dicarboxylic acid, an aromatic diol and an aromatic hydroxycarboxylic acid;

(2) polyester of a combination of different kinds of aromatic hydroxycarboxylic acids;

(3) polyester of a combination of an aromatic dicarboxylic acid and a nuclear-substituted aromatic diol;

(4) polyester obtained by reacting a polyester such as polyethylene terephthalate with an aromatic hydroxycarboxylic acid, etc., and the polyester forms an anisotropic melt at a temperature of not more than 400° C. In place of the aromatic dicarboxylic acid, aromatic diol and aromatic hydroxycarboxylic acid, an ester-forming derivative thereof may also be used.

Examples of the repeating unit of the liquid crystal polyester include the following repeating unit derived from the aromatic dicarboxylic acid (1), repeating unit derived from the aromatic diol (2) and repeating unit derived from the aromatic hydroxycarboxylic acid (3), but are not limited to these.

(1) Repeating unit derived from aromatic dicarboxylic acid:
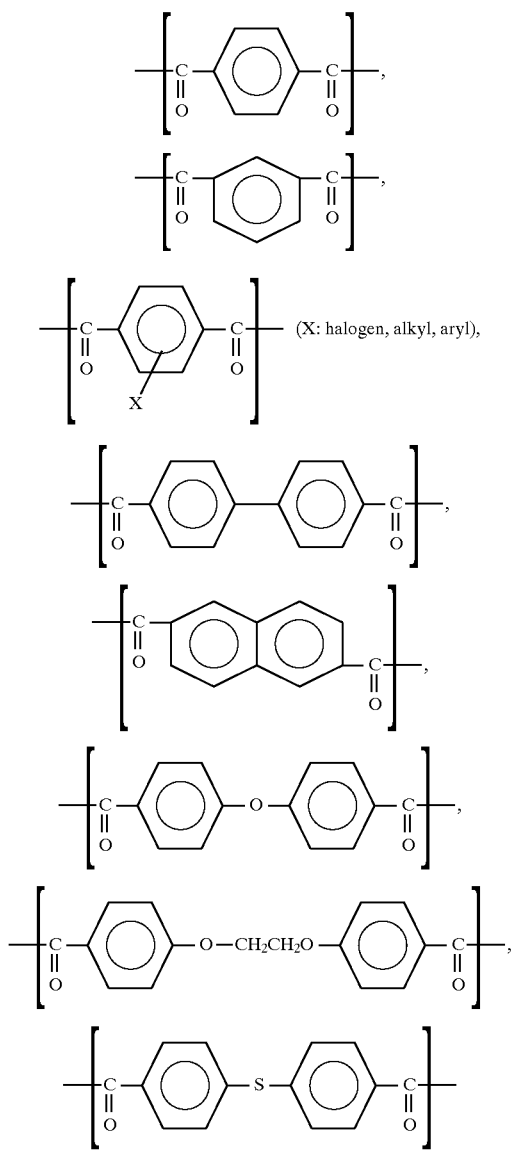
(2) Repeating units derived from aromatic diol:
(3) Repeating units derived from aromatic hydroxycarboxylic acid:

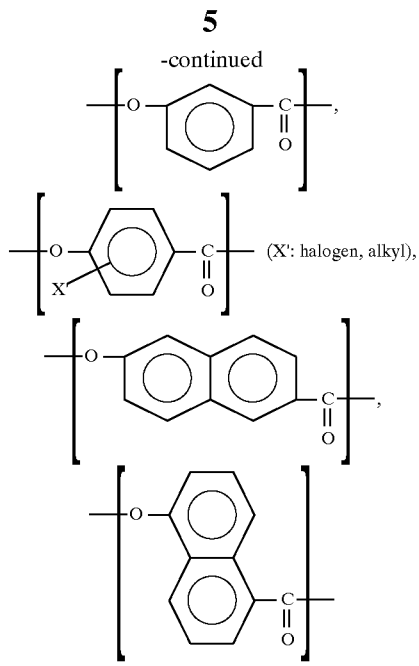

The liquid crystal polyester, which is particularly preferred in view of a balance between heat resistance, mechanical characteristics and processability, comprises a repeating structural unit:

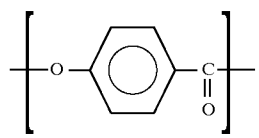

and examples thereof include polyesters whose combination of repeating structural units is any one of the following combinations (I) to (V).

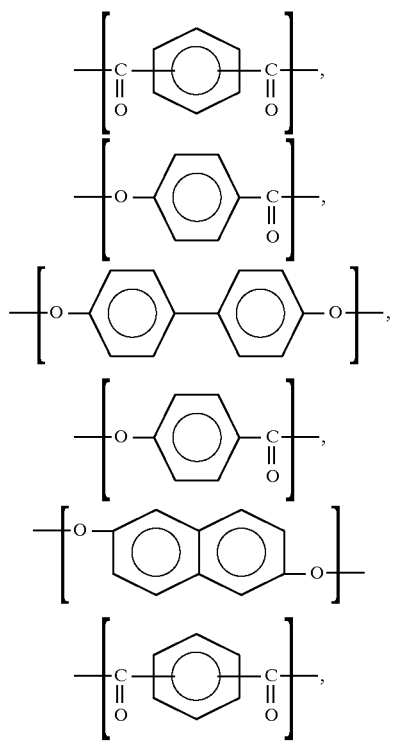

(I)

(II)

(III)

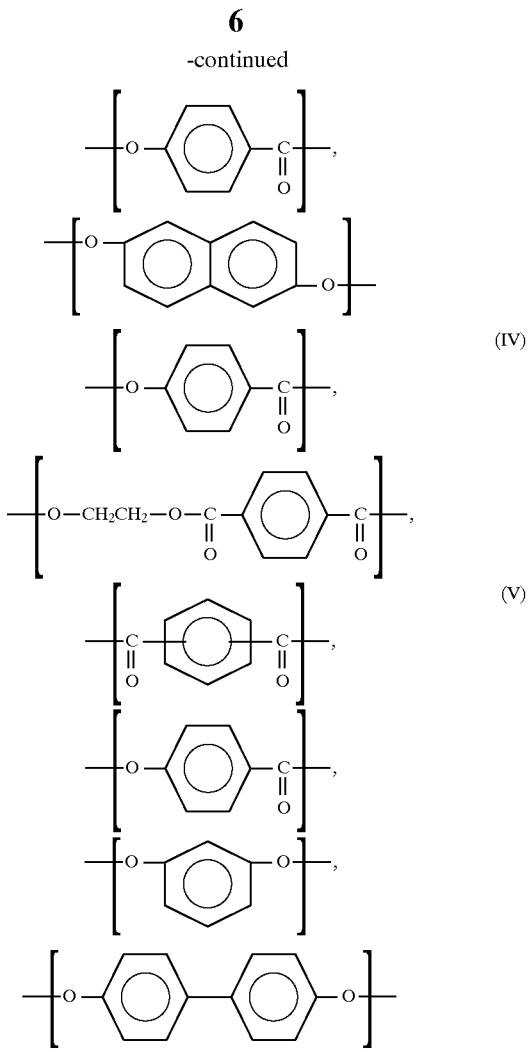

(IV)

(V)

The liquid crystal polyester is described, for example, in Japanese Patent Kokoku Publication Nos. 47-47870, 63-3888, 63-3891 and 56-18016 and Japanese Patent Kokai (Laid-Open) Publication No. 2-51523.

Among them, the combination of (I), (II) or (III) is preferred and that of (I) or (III) is more preferred.

In the liquid crystal polyester resin composition of the present invention, there can be preferably used a liquid crystal polyester, wherein the liquid crystal polyester as the component (A) comprises 30 to 80 molar % of the following repeating unit (a'), 0 to 10 molar % of the repeating unit (b'), 10 to 25 molar % of the repeating unit (c') and 10 to 35 molar % of the repeating unit (d'), for the field where high heat resistance is required.

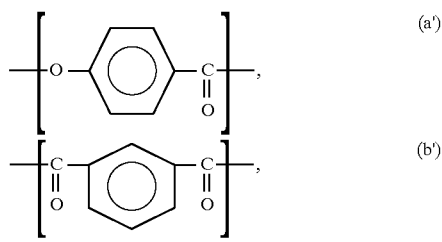

(a')

(b')

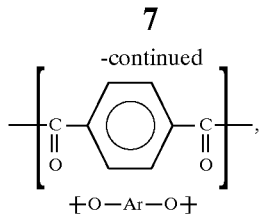

wherein Ar is a divalent aromatic group.

The epoxy group-containing ethylene copolymer as the component (B) of the liquid crystal polyester resin composition in the present invention is an epoxy group-containing ethylene copolymer comprising 50 to 99.9% by weight of an ethylene unit (a), 0.1 to 30% by weight, preferably 0.5 to 20% by weight of an unsaturated carboxylic acid glycidyl ester unit or an unsaturated glycidyl ether unit (b) and 0 to 49.9% by weight of an ethylenically unsaturated ester compound unit.

The compounds, which give the unsaturated carboxylic acid glycidyl ester unit and unsaturated glycidyl ether unit in the epoxy group-containing ethylene copolymer (B), are respectively represented by the following general formulas:

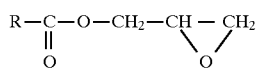

wherein R is a $C_{2-13}$ hydrocarbon group having an ethylenically unsaturated bond.

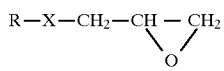

wherein R is a $C_{2-18}$ hydrocarbon group having an ethylenically unsaturated bond, and X is —$CH_2$—O— or

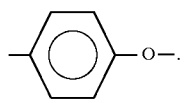

Specific examples thereof include glycidyl acrylate, glycidyl methacrylate, itaconic acid glycidyl ester, allyl glycidyl ether, 2-methylallyl glycidyl ether, styrene-p-glycidyl ether, etc.

As the epoxy group-containing ethylene copolymer (B) in the present invention, there can also be used a polydimensional (three or more dimensional) copolymer of the unsaturated carboxylic acid glycidyl ester or unsaturated glycidyl ether, ethylene and ethylenically unsaturated ester compound (c).

Examples of the ethylenically unsaturated ester compound (C) include carboxylic acid vinyl esters and α, β-unsaturated carboxylic acid alkyl esters, such as vinyl acetate, vinyl propionate, methyl acrylate, ethyl acrylate, butyl acrylate, methyl methacrylate, ethyl methacrylate, butyl methacrylate, etc. Among them, vinyl acetate, methyl acrylate and ethyl acrylate are particularly preferred.

Specific examples of the epoxy group-containing ethylene copolymer (B) used in the present invention include copolymer of an ethylene unit and a glycidyl methacrylate unit, copolymer of an ethylene unit, a glycidyl methacrylate unit and a methyl acrylate unit, copolymer of an ethylene unit, a glycidyl methacrylate unit and an ethyl acrylate unit, copolymer of an ethylene unit, a glycidyl methacrylate unit and a vinyl acetate unit, etc.

A melt index (hereinafter referred to as "MFR", measured at 190° C. under a load of 2.16 kg according to JIS K6760) of the epoxy group-containing ethylene copolymer (B) is preferably from 0.5 to 100 g/10 minutes, more preferably from 2 to 50 g/10 minutes. The melt index may not be within the above range. However, when the melt index exceeds 100 g/10 minutes, mechanical characteristics of the resultant composition are not preferred. On the other hand, when the melt index is less than 0.5 g/10 minutes, a compatibility between the copolymer (B) and liquid crystal polyester as the component (A) is inferior, and it is not preferred.

As the epoxy group-containing ethylene copolymer (B) used in the present invention, a copolymer having a stiffness modulus of 10 to 1300 kg/cm$^2$ is preferred and that having a stiffness modulus of 20 to 1100 kg/cm$^2$ is more preferred.

When the stiffness modulus is not within this range, the moldability and mechanical properties of the resultant composition become insufficient, sometimes, and it is not preferred.

The production process of the epoxy group-containing copolymer is described, for example, in Japanese Patent Kokai (Laid open) Publication Nos. 52-33986 and 51-122185, and Japanese Patent Kokoku Publication No. 52-28836.

The epoxy group-containing ethylene copolymer is normally produced by a process of copolymerizing an unsaturated epoxy compound with ethylene at 100° to 300° C. under 500 to 4000 atm in the presence of an radical generator, in the presence or absence of a suitable solvent or a chain transfer agent. It can also be produced by a process of mixing polyethylene with an unsaturated epoxy compound and a radical generator, followed by performing melt graft copolymerization in an extruder.

A ratio of the component (A) to component (B) [(A):(B)] in the liquid crystal polyester resin composition used in the present invention is 56 to 99% by weight, preferably 65 to 98% by weight: 44 to 1% by weight, preferably 35 to 2% by weight.

When an amount of the component (A) is less than 56% by weight, the heat resistance of the composition is deteriorated, and it is not preferred. On the other hand, when the amount of the component (A) exceeds 99% by weight, the effect of improving an anisotropy of the composition is sometimes insufficient and the cost also becomes high, and it is not preferred.

The process for producing the liquid crystal polyester resin composition in the present invention is not specifically limited, and a conventional process can be used. For example, there can be used a process of mixing the respective components in a solution state and evaporating a solvent or precipitating them in the solvent. From an industrial point of view, a process of kneading the respective components in a molten state is preferred. There can be used single or double screw extruders and various kneading devices (e.g. kneader, etc.), which are generally used, for kneading with melting. Among them, a twin screw high-speed kneader is particularly preferred.

In case of kneading with melting, a cylinder set temperature of the kneading device is preferably from 200° to 360° C., more preferably from 230° to 350° C.

A film can also be obtained directly by mixing the respective components and kneading with melting on film-forming such as inflation molding via no process of pre-kneading.

In case of kneading, the respective components may be uniformly mixing in advance with a device such as tumbler, Henschel mixer, etc. If necessary, there can also be used a process of separately feeding a predetermined amount of the respective components to a kneading device without mixing.

In the liquid crystal polyester resin composition used in the present invention, an inorganic filler may be optionally used. Examples of the inorganic filler include calcium carbonate, talc, clay, silica, magnesium carbonate, barium sulfate, titanium oxide, alumina, terra alba, glass flake, glass fiber, carbon fiber, alumina fiber, silica alumina fiber, aluminum borate whisker, potassium titanate fiber, etc.

Various additives such as organic fillers, antioxidants, heat stabilizers, photostabilizers, flame retardants, lubricants, antistatics, inorganic or organic colorants, rust preventives, crosslinking agents, foaming agents, fluorescent agents, surface smoothing agents, surface gloss modifiers, release modifiers, etc. can be optionally added to the liquid crystal polyester resin composition in the production process or processing process thereafter.

A thickness of the liquid crystal polyester resin composition in the present invention is not specifically limited, but is preferably from 3 to 500 μm, more preferably from 5 to 200 μm.

The laminated material of the present invention can further contain a thermoplastic resin layer as the constituent component.

As the thermoplastic resin, there can be used any thermoplastic polymer except liquid crystalline polyesters and their resin compositions. There can be preferably used at least one sort of a thermoplastic resin selected from polyolefin, polyester and polyamide.

As the polyolefin, there can be used a homopolymer or a copolymer of olefins having 2 to 20 carbon atoms. Examples of the olefin and diolefin include ethylene, propylene, butene-1, pentene-1, hexene-1, heptene-1, octene-1, nonene-1, decene-1, hexadecene-1, eicosene-1, 4-methylpentene-1, 5-methyl-2-pentene-1, etc. Examples of the polyolefin include low-density polyethylene, high-density polyethylene, polypropylene, poly-1-butene, poly-4-methylpentene-1, ethylene/butene-1 copolymer, ethylene/4-methylpentene-1 copolymer, ethylene/hexene-1 copolymer, propylene/ethylene copolymer, propylene/butene-1 copolymer, etc.

Examples of the polyester include polycondensate of divalent carboxylic acid and divalent alcohol. In that case, it is preferably polycondensate of aromatic dicarboxylic acid and alkylene glycol. Example of the polyester include polyethylene terephthalate, polybutylene terephthalate, etc.

Examples of the polyamide include polycondensate of divalent carboxylic acid and divalent amine, polycondensate of aminocarboxylic acid, etc. Specific examples of the polyamide include polyamide 6, polyamide 12, polyamide 11, polyamide 6—6, polyamide 6-12, polyamide MXD6, etc.

As the resin of the thermoplastic resin layer, polyethylene is preferred and low-density polyethylene is more preferred. A thickness of the thermoplastic resin layer is not specifically limited, but is preferably from 5 to 100 μm. The thermoplastic resin layer and paper layer as the substrate or liquid crystal polyester resin layer can be adhered each other by hot press method.

The laminated material of the present invention is formed of a paper layer (I) as the substrate and a liquid crystal polyester resin composition layer (II), but may be a two-layer laminate of the layer (I) and layer (II) or a laminate of three or more layer obtained by alternatively laminating the layers (I) and (II), a three-layer laminate of the layer (II), layer (I) and a layer of thermoplastic resin such as polyethylene, or a laminate of four or more layer obtained by alternatively laminating the layers (I), (II) or thermoplastic resin layer.

An adhesive layer may be optionally present between the respective layers.

The process for producing the laminated material in the present invention is not specifically limited, and examples thereof include process of producing a laminate, comprising heat-bonding a liquid crystal polyester resin composition film obtained by an inflation molding process with a paper layer, or heat-bonding the paper layer with a thermoplastic resin film, using a hot roll or a press machine, a process of coating a paper layer with a molten liquid crystal polyester resin composition, a process of laminating a laminate obtained by coextruding the liquid crystal polyester resin and thermoplastic resin, etc.

It is possible to obtain a paper pack container by using the laminated material in the present invention.

A shape of the paper pack container and a production process thereof are not specifically limited, and any shape such as rectangular parallelopiped, cube, cylinder, etc. can be optionally selected. For example, the paper pack container can be obtained by cutting the laminated material into a predetermined shape, followed by heat bonding.

The laminated material of the present invention does not evolve a halogen-containing gas on disposal or combustion, and no ash content is remained.

Examples of contents include milk, coffee, oolong tea, soup, mineral water, fruit juice, cosmetic, perfume, drug, etc.

One embodiment of the paper pack container formed from the laminated material of the present invention is shown in FIG. 1.

The paper pack container is composed of three layers, that is, a low-density polyethylene layer on the side in contact with the contents (e.g. milk), a liquid crystal polyester resin composition layer on the intermediate side and a milk carton paper layer on the outside.

The laminated material of the present invention has excellent gas barrier properties and is cheap and easily molded and, therefore, it can be widely used for food packaging container, drug packaging container, cosmetic packaging container, electronic material packaging container, etc.

The following Examples further illustrate the present invention in detail but are not to be construed to limit the scope thereof.

(1) Liquid crystal polyester as component (A)

(i) p-Acetoxybenzoic acid (8.3 kg, 60 mol), terephthalic acid (2.49 kg, 15 mol), isophthalic acid (0.83 kg, 5 mol) and 4,4'-diacetoxydiphenyl (5.45 kg, 20.2 mol) were charged in a polymerization tank equipped with a comb-type stirring blade and, after raising the temperature with stirring under a nitrogen gas atmosphere, the mixture was polymerized at 330° C. for one hour. The polymerization was conducted with vigorously stirring while an acetic acid gas formed as the by-product during the polymerization was liquefied with a cooling tube and removed. Then, the system was slowly cooled and the polymer obtained was collected from the system at 200° C. The resultant polymer was ground using a hammer mill manufactured by Hosokawa Micron Co., Ltd. to give particles having a particle size of not more than 2.5 mm. The resultant particles were further treated in a rotary kiln under a nitrogen atmosphere at 280° C. for 3 hours to obtain a particulate total aromatic polyester comprising a repeating structural unit of the following chemical formula 20 (flow temperature: 324° C.).

The "flow temperature" used herein means a temperature where a melt viscosity indicates 48000 poise when a resin heated at a heating rate of 4° C./minute is extruded from a nozzle having an inner diameter of 1 mm and a length of 10 mm under a load of 100 kgf/cm$^2$ using a Koka flow tester, model CFT-500 manufactured by Shimadzu Co.

Hereinafter, the liquid crystal polyester is abbreviated to "A-1". This polymer showed an optical anisotropy at not less than 340° C. under pressure. The repeating structural units of the liquid crystal polyester are as follows.

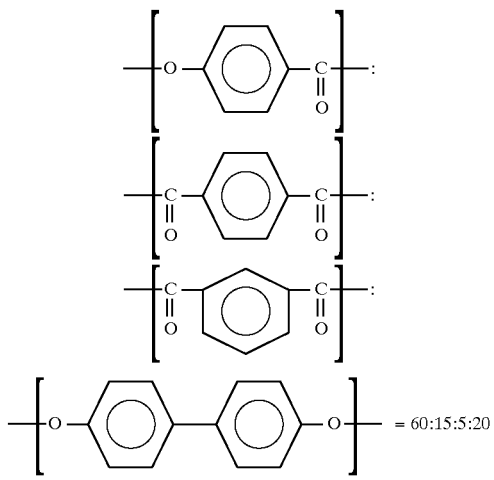

= 60:15:5:20

(ii) p-Hydroxybenzoic acid (16.6 kg, 121 mol), 6-hydroxy-2-naphthoic acid (8.4 kg, 45 mol) and acetic anhydride (18.6 kg, 182 mol) were charged in a polymerization tank equipped with a comb-type stirring blade and, after raising the temperature with stirring under a nitrogen gas atmosphere, the mixture was polymerized at 320° C. for one hour and then polymerized under reduced pressure at 320° C. for one hour. Acetic acid formed as the by-product during the polymerization was removed out of the system. Then, the system was slowly cooled and the polymer obtained was collected from the system at 180° C.

The resultant polymer was ground according to the same manner as that described in the production of (A-1), and then the resultant particles were treated in a rotary kiln under a nitrogen atmosphere at 240° C. for 5 hours to obtain a particulate total aromatic polyester comprising a repeating structural unit of the following chemical formula 21 (flow temperature: 270° C).

Hereinafter, the liquid crystal polyester is abbreviated to "A-2". This polymer showed an optical anisotropy at not less than 280° C. under pressure.

A ratio of the repeating structural units of the liquid crystal polyester A-2 is as follows.

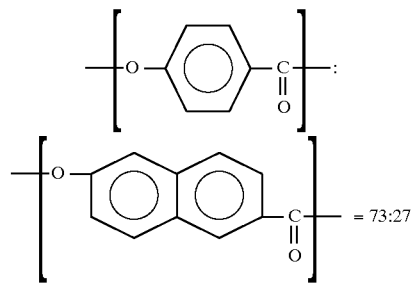

= 73:27

(2) Epoxy group-containing ethylene copolymer as component (B)

The abbreviations, copolymer composition (weight ratio), melt flow index (MFR) and stiffness modulus of the epoxy group-containing ethylene copolymers obtained by a high-pressure radical polymerization process are as follows.

MFR refers to a value (unit: g/10 min) measured at 190° C. under a load of 2.16 kg according to JIS K6710 and the stiffness modulus refers to a value measured according to ASTM D747. Abbreviation B-1: trade name: 20B, manufactured by Sumitomo Chemical Company Co., Ltd.

Weight ratio: E/GMA/VA=83/12/5

MFR=20, stiffness modulus=430 kg/cm$^2$ Abbreviation B-2: trade name: 7L, manufactured by Sumitomo Chemical Company Co., Ltd.

Weight ratio: E/GMA/MA=67/3/30

MFR=9, stiffness modulus=60 kg/cm$^2$ where E is ethylene, GMA is glycidyl methacrylate, VA is vinyl acetate and MA is methyl acrylate.

(3) Measuring process of gas permeability

The gas permeability of the resultant laminated material was measured as follows.

Oxygen gas permeability: It was measured at 20° C. using an oxygen as according to the process of JIS K7126 A (pressure differential process). An unit is cc/m$^2$·24 hour·1 atm.

Water vapor permeability: It was measured at 40° C. under the condition of a relative humidity of 90% according to JIS Z208 (cup process). An unit is g/m$^2$·24 hour·1 atm.

REFERENCE EXAMPLE

The respective components were mixed together according to the composition of Table 1, using a Henschel mixer, and the mixture was kneaded as shown in Table 1 using a twin screw extruder, model TEX-30 manufactured by Nihon Seiko Co., Ltd. to obtain a composition.

Pellets of this composition were extruded as shown in Table 1 using a 30 mm ⌀ single screw extruder equipped with a cylindrical die having a diameter of 50 mm and a die gap of 1.2 mm, and a molten resin was extruded in the upper direction from a cylindrical die at a die set temperature shown in Table 1. Then, dry air was injected into a hollow part of this cylindrical film to expand the cylindrical film. After cooling, the cylindrical film was wound up through a nip roll at a winding-up speed of 15 to 25 m/minute to obtain a liquid crystal polyester resin composition film.

In this case, as shown in Table 1, a film could not be obtained in the systems containing only a liquid crystal polyester (G-2, G-5) or system wherein a low-density polyethylene was formulated in the liquid crystal polyester (G-3).

A stretch ratio of the liquid crystal polyester resin composition film in the winding up direction (MD direction) and the direction perpendicular to the winding up direction (TD direction) was controlled by the amount of dry air to be injected and film winding up speed. The stretch ratio in the MD direction was set at 2.0 to 3.0 and a blow ratio in the TD direction was set at 2.0 to 3.0. The results are as shown in Table 1.

TABLE 1

| | Composition (% by weight) | | Melt kneading | | Inflation film molding | | | | | Film*1 prossesibility | Film thickness (μm) |
|---|---|---|---|---|---|---|---|---|---|---|---|
| | | | Cylinder set temperature (°C.) | Screw revolution (rpm) | Cylinder set temperature (°C.) | Screw revolution (rpm) | Die set temperature (°C.) | Blow ratio | Stretch ratio | | |
| G-1 | A-1 75 | B-1 25 | 345 | 200 | 350 | 80 | 350 | 3.2 | 9.7 | ○ | 33 |
| G-2 | A-1 100 | 0 | 345 | 200 | 350 | 80 | 350 | | | X | |
| G-3 | A-1 75 | 25*2 | 345 | 200 | 350 | 80 | 350 | | | X | |
| G-4 | A-2 83 | B-2 17 | 295 | 200 | 297 | 80 | 297 | 7.3 | 11.6 | ○ | 17 |
| G-5 | A-2 100 | 0 | 295 | 200 | 297 | 80 | 297 | | | X | |

*1Criteria for evaluation of film-forming properties are as follows.
○: Inflation film-forming can be conducted, thereby obtaining a film having good appearance.
X: Inflation film-forming can not be conducted.
*2Low-density polyethylene, manufactured by Sumitomo Chemical Company Co., Ltd. Trade name: Sumikathen F1103-1 [MFR = 0.51, stiffness modulus = 1300 kg/cm$^2$]

EXAMPLES 1 AND 2 AND COMPARATIVE EXAMPLE 1

The liquid crystal polyester resin composition film (G-1, G-4) obtained in Reference Example and a kraft paper having a thickness of 150 μm were heat bonded using a laminator manufactured by Toyo Seiki Co., Ltd. to obtain a two-layer laminated film. The results of the gas barrier test of the laminated film and kraft paper are shown in Table 2.

EXAMPLE 3

A low-density polyethylene film having a thickness of 10 μm was laminated on a milk carton paper having a weight of 290 g/m$^2$ by a press process, and then a liquid crystal polyester resin composition film G-4 was laminated on the polyethylene film by a press process. The resultant three-layer laminate was subjected to the gas barrier test. The results are shown in Table 2.

COMPARATIVE EXAMPLE 2

According to the same manner as that described in Example 3 except for using the liquid crystal polyester resin composition G-4, a laminate film was obtained and then subjected to the gas barrier test. The results are shown in Table 2.

EXAMPLE 4

Pellets of the composition G-4 in Reference Example were kneaded with melting at a cylinder set temperature of 288° C. and a screw revolution of 80 rpm using a 20 mm ø single screw extruder equipped with a T-die (model VS20-20, manufactured by Tanabe Plastics Co., Ltd.), extruded from a T-die having a die lip width of 100 mm and a die slit distance of 0.5 mm and then laminated on a general wood free paper layer having a thickness of 200 μm to obtain a two-layer laminate. The thickness of the liquid crystal polyester resin composition layer was 35 μm. The gas barrier performances of the laminate are as shown in Table 2.

TABLE 2

| | Construction of laminate | Water vapor permeability (g/m$^2$ · 24 hour · atm) | Oxygen gas permeability (cc/m$^2$ · 24 hour · atm) |
|---|---|---|---|
| Example 1 | G-1*1/kraft paper | 0.3 | 0.6 |
| Example 2 | G-4*1/kraft paper | 0.5 | 0.7 |
| Comparative Example 1 | Kraft paper | 290 | >1000 |
| Example 3 | G-4*1/low-density polyethylene/milk carton paper | 0.4 | 0.6 |
| Comparative Example 2 | Low-density polyethylene/milk carton paper | 29 | >1000 |
| Example 4 | G-4*2/general wood free paper | 0.2 | 0.2 |

*1: Inflation processing film
*2: T-die processing film

What is claimed is:

1. A laminated material comprising at least a paper layer as a substrate and a layer of a liquid crystal polyester resin composition containing 56 to 99% by weight of a liquid crystal polyester (A) and 44 to 1% by weight of an epoxy group-containing ethylene copolymer (B) consisting of the following components:

(a) 50 to 99.9% by weight of an ethylene unit;

(b) 0.1 to 30% by weight of an unsaturated carboxylic acid glycidyl ester unit or an unsaturated glycidyl ether unit; and (c) 0 to 49.9% by weight of an ethylenically unsaturated ester compound, the paper layer and the layer of the liquid polyester resin composition being laminated to each other.

2. The laminated material according to claim 1, further comprising a thermoplastic resin layer laminated to the substrate or to the liquid crystal polyester resin composition layer.

3. The laminated material according to claim 1 or 2, wherein the liquid polyester (A) comprises the following repeating unit:

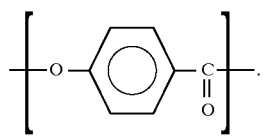

4. The laminated material according to claim 1 or 2, wherein the liquid polyester (A) comprises the following repeating units:

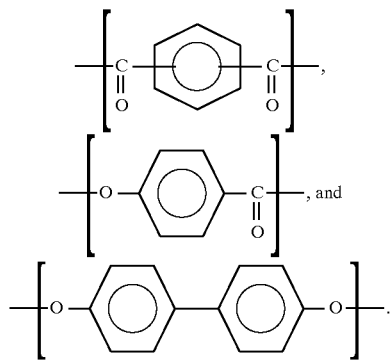

5. The laminated material according to claim 1 or 2, wherein the liquid polyester (A) comprises the following repeating units:

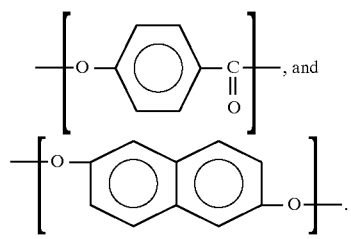

6. The laminated material according to claim 1 or 2, wherein the liquid polyester (A) comprises the following repeating units:

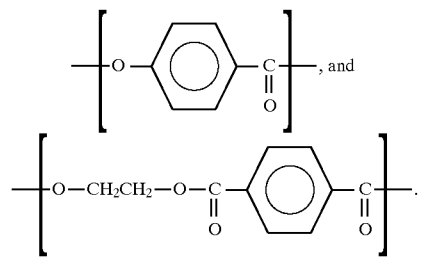

7. A paper pack container formed from the laminated material of claim 1 or 2.

8. The laminated material according to claim 1 or 2, wherein the liquid polyester (A) comprises the following repeating units:

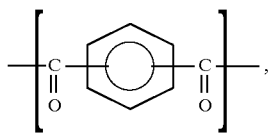

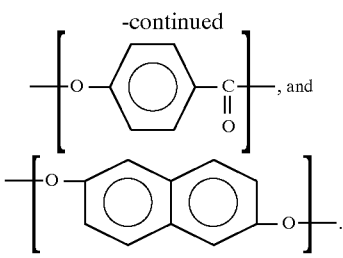

9. The laminated material according to claim 1 or 2, wherein the liquid polyester (A) comprises the following repeating units:

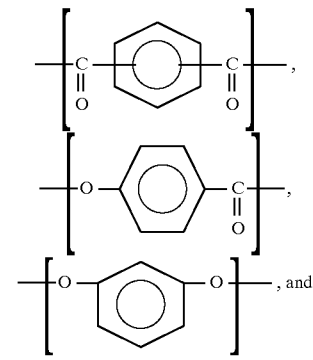

10. The laminated material according to claim 1 or 2, wherein the liquid polyester (A) comprises the following repeating units:

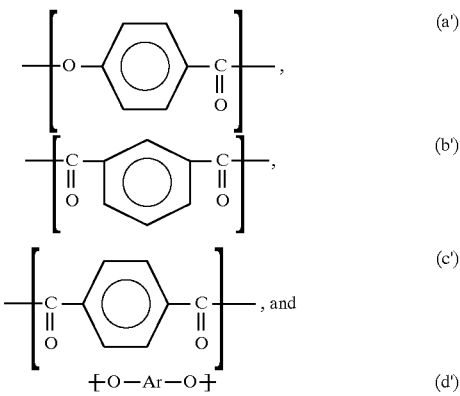

wherein Ar is a divalent aromatic group.

11. The laminated material according to claim 11, wherein repeating unit (a') is present in an amount of 30–80 molar percent, repeating unit (b') is present in an amount of 0–10 molar percent, repeating unit (c') is present in an amount of 10–25 molar percent, and repeating unit (d') is present in an amount of 10–35 molar percent.

* * * * *